(12) United States Patent
Polk et al.

(10) Patent No.: US 8,837,282 B2
(45) Date of Patent: Sep. 16, 2014

(54) METHOD AND APPARATUS FOR POOLING BANDWIDTH ACROSS DISPARATE BANDWIDTH RESERVATIONS

(75) Inventors: James M. Polk, Colleyville, TX (US); Paul E. Jones, Apex, NC (US); Subhasri Dhesikan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 332 days.

(21) Appl. No.: 13/291,333

(22) Filed: Nov. 8, 2011

(65) Prior Publication Data

US 2013/0114426 A1    May 9, 2013

(51) Int. Cl.
*G08C 15/00*    (2006.01)
*H04L 12/28*    (2006.01)
*H04J 3/16*    (2006.01)
*H04J 3/18*    (2006.01)
*G06F 15/173*    (2006.01)
*G06F 15/16*    (2006.01)
*G06F 3/00*    (2006.01)
*H04L 12/913*    (2013.01)
*H04L 12/24*    (2006.01)
*H04L 12/911*    (2013.01)
*H04L 12/54*    (2013.01)

(52) U.S. Cl.
CPC ............ *H04L 47/828* (2013.01); *H04L 47/724* (2013.01); *H04L 41/0896* (2013.01); *H04L 12/5695* (2013.01)
USPC ...... 370/230; 370/235; 370/252; 370/395.21; 370/395.41; 370/468; 370/477; 709/226; 709/232; 710/29

(58) Field of Classification Search
CPC ............ H04L 12/2697; H04L 12/5693; H04L 12/5695; H04L 29/06; H04L 29/0604; H04L 29/06027; H04L 29/0653; H04L 47/10; H04L 47/15; H04L 47/30; H04L 47/32; H04L 47/805; H04L 47/2441; H04L 47/6225; H04L 43/00; H04L 43/50; H04L 43/0852; H04L 29/08072; H04L 29/08117; H04L 29/08144; H04L 29/0817; H04L 2012/5679; H04J 3/1682; H04W 28/06; G06F 5/06; G06F 13/28; G06F 13/385; G10L 19/02; H04Q 11/0478
USPC ......... 370/230, 252, 253, 392, 395.21, 394.5, 370/395.41, 468, 477, 235; 709/226, 227, 709/229, 234, 232; 710/29
See application file for complete search history.

(56) References Cited

U.S. PATENT DOCUMENTS 7,209,439 B2 *   4/2007   Rawlins et al. ............... 370/230
7,512,063 B2     3/2009   Vasseur et al.
7,796,519 B2 *   9/2010   Yoshihara et al. ............ 370/236

(Continued)

OTHER PUBLICATIONS

F. Baker et al.; Aggregation of RSVP for IPv4 and IPv6 Reservations; Network Working Group Request for Comments: 3175; Sep. 2001; http://tools.ietf.org/rfc/rfc3175.txt.

*Primary Examiner* — Alpus H Hsu
*Assistant Examiner* — Dharmesh Patel
(74) *Attorney, Agent, or Firm* — P. Su

(57) ABSTRACT

In one embodiment, a method includes obtaining a message associated with a data flow that includes a first indicator that identifies an amount of requested pool bandwidth and a second indicator that identifies a pool with which the data flow is associated. The pool is associated with a plurality of data flows that includes the data flow. The method also includes determining whether the pool has an overall bandwidth allocation, and, if so, determining whether reserving the amount of requested bandwidth would cause the overall bandwidth allocation to exceed a maximum pool bandwidth allocation. Finally, the method includes reserving approximately the amount of requested bandwidth when it is determined that reserving the amount of requested bandwidth would not cause the overall bandwidth allocation to exceed the maximum pool bandwidth allocation. Reserving approximately the amount of requested bandwidth includes increasing the overall bandwidth allocation by the amount of requested bandwidth.

16 Claims, 10 Drawing Sheets

(56) References Cited

U.S. PATENT DOCUMENTS

| | | |
|---|---|---|
| 8,374,077 B2 | 2/2013 | Li et al. |
| 8,374,082 B2 | 2/2013 | Lange |
| 2003/0126287 A1 | 7/2003 | Charny et al. |
| 2010/0111103 A1* | 5/2010 | Dhesikan et al. ............ 370/468 |

* cited by examiner

METHOD AND APPARATUS FOR POOLING BANDWIDTH ACROSS DISPARATE BANDWIDTH RESERVATIONS

The disclosure relates generally to network communications and, more particularly, to enabling applications that transmit one or more data flows from one or more end systems within a network to reserve network resources for the multiple data flows such that the multiple data flows may share the reserved bandwidth.

BACKGROUND

Resource Reservation Protocol (RSVP) is a protocol, i.e., a transport layer protocol as defined in RFC 2205 which may be found at http://www.rfc-editor.org/rfc/rfc2205.txt, designed to allow an application to reserve resources across a network for a given data flow. A data flow is typically constrained in scope to a 5-tuple identification that includes a source address, a destination address, a source port, a destination port, and a transport protocol.

Many applications transmit more than one distinct data flow. Such applications that transmit multiple distinct data flows may cause some data flows to reduce their transmission rates to lower rates than asked for within reservation set-up messages in order to effectively share network resources with other data flows. When multiple data flows associated with an application are each transmitted over different ports, each of the data flows independently reserves bandwidth using RSVP. If there is insufficient bandwidth available to meet all of the requests for bandwidth, even if it may be possible to reduce the rate of flow for any of the data flows, reducing the rate of a data flow which utilizes one port does not alleviate bandwidth issues for a data flow that utilizes a different port. For example, as bandwidth is not shared amongst data flows, when a data flow that uses a first port has its rate reduced, any bandwidth issues for data flows that utilize different ports is not alleviated. Thus, all of the multiple data flows are not able to be transmitted, as relying on RSVP to reduce bandwidth for a particular data flow associated with an application may not be sufficient to allow all distinct data flows associated with the application to be transmitted.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1A:
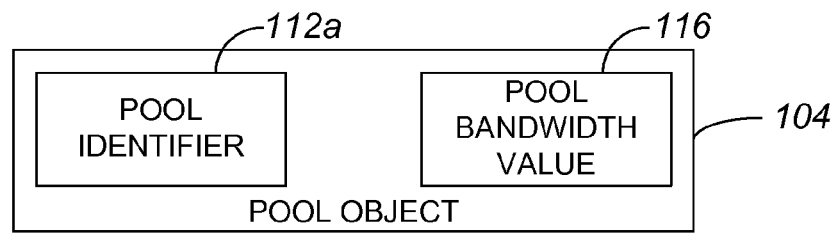
FIG. 1A is a block diagram representation of a pool object suitable for use in a resource reservation protocol (RSVP) environment in accordance with an embodiment.

According to one aspect, a method includes obtaining a first message associated with a first data flow, the first message including a first indicator that identifies a first amount of requested pool bandwidth and a second indicator that identifies a pool with which the first data flow is associated, wherein the pool is associated with a plurality of data flows that includes the first data flow. The method also includes determining whether the pool identified by the second indicator has an overall pool bandwidth allocation, and if the pool has the overall pool bandwidth allocation, determining whether reserving the first amount of requested bandwidth would cause the overall pool bandwidth allocation to exceed a maximum pool bandwidth allocation associated with the pool. Finally, the method includes reserving approximately the first amount of requested bandwidth when it is determined that reserving the first amount of requested bandwidth would not cause the overall pool bandwidth allocation to exceed the maximum pool bandwidth allocation associated with the pool. Reserving approximately the first amount of requested bandwidth includes increasing the overall pool bandwidth allocation by the first amount of requested bandwidth.

Description

Reliance on resource reservation protocol (RSVP) to reduce the rate associated with a data flow, e.g., the actual bandwidth used by the data flow, may be effective in allowing resources to be shared with other data flows which are transmitted over the same port. However, when an application includes multiple distinct data flows transmitted over different ports, reducing the rate associated with a data flow transmitted over one port is generally not effective in alleviating bandwidth issues for data flows transmitted over other ports.

Allowing bandwidth to effectively be pooled across multiple data flows, including data flows transmitted over different ports and/or different end systems, allows the overall bandwidth associated with a network to be used efficiently. In other words, a bandwidth reservation may be pooled, or shared, with other bandwidth reservations that are a part of a communication session. Thus, if a first data flow associated with an application is in need of more bandwidth, the bandwidth of the first data flow may be increased by the application while the bandwidth of a second data flow that is part of the same pool as the first data flow may be decreased by the application, even if the data flows are associated with different ports. By allowing an application, such as an application located on an endpoint, to essentially adjust data flows associated therewith, bandwidth may be efficiently shared amongst the data flows, thereby improving the use of bandwidth across RSVP sessions. Further, the amount of network signaling may be reduced, as bandwidth adjustments are substantially between applications within a common pool, and new reservation signaling is generally not needed.

Multiple data flows may be associated with multiple applications located on different sources, or multiple data flows may be associated with multiple applications located on the same source. Pooling bandwidth allows multiple data flows associated with applications on different sources to share bandwidth, and also allows multiple data flows associated with applications on one source to share bandwidth.

In one embodiment, a pool object may be created to facilitate the pooling of bandwidth across multiple data flows. The pool object may generally identify a pool, e.g., a set of reservation requests that share bandwidth, and a maximum bandwidth associated with the pool. Using a pool object, a single logical reservation may be created that is associated with multiple discrete reservation requests and associated data flows, e.g., different port or protocol numbers. The use of a pool object, which may be included in messages such as PATH messages or reservation requests transmitted from an endpoint, within a network allows the endpoint to increase the bit rate of one associated data flow and to decrease the bit rate of another associated data flow, as long as the maximum pool bandwidth is not exceeded.

Referring initially to FIG. 1A, a pool object suitable for use in a RSVP environment will be described in accordance with an embodiment. A pool object 104 includes a pool identifier 112a and a pool bandwidth value 116. In one embodiment, the pool bandwidth value 116 represents a maximum pool bandwidth. Pool identifier 112a is a unique identifier, e.g., a globally unique identifier, that allows components within a network to identify reservations, e.g., RSVP reservations, that are in the same pool. Pool bandwidth value 116 is a numerical value, e.g., an integer value, that represents a substantially maximum bandwidth that may be transmitted by the pool identified by pool identifier 112a. In other words, pool bandwidth value 116 represents approximately the maximum amount of bandwidth that may be transmitted by substantially all data flows that are associated, e.g., are included in, the pool identified by pool identifier 112a.

Figure 1B:
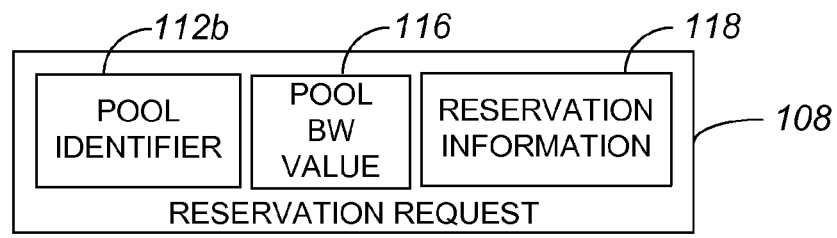
FIG. 1B is a block diagram representation of a reservation request that includes a pool identifier in accordance with an embodiment.

Pool object 104 may be transmitted within any suitable RSVP message. In one embodiment, each reservation request for a data flow that is part of a pool may include a pool object that identifies the pool. More generally, each reservation request for a data flow that is part of a pool includes an identifier that identifies the pool and, typically, a maximum bandwidth as well. In general, a pool identifier is included in a pool object. Thus, if a pool object exists, then the pool object includes a pool identifier. FIG. 1B is a block diagram representation of a reservation request that includes at least a pool identifier in accordance with an embodiment. A reservation request 108, e.g., an RSVP reservation request, is generally arranged to provide information 118 that enables an RSVP node, e.g., a router or a switch, that is a recipient of reservation request 108 may reserve bandwidth for the originator or the transmitter of reservation request 108. Information 118 may generally include, but is not limited to including, information that identifies a transmitter of reservation request 108 and an amount of bandwidth that is desired.

Reservation request 108 also includes a pool identifier 112b that identifies a pool with which reservation request 108 is associated and pool bandwidth 116. That is, pool identifier 112b effectively identifies reservation request 108 as being associated with a data flow that is part of a pool. As previously mentioned, pool bandwidth 116 is generally a maximum pool bandwidth, although pool bandwidth 116 is not limited to being a maximum pool bandwidth. It should be appreciated that pool identifier 112b and pool bandwidth 116 may be included in a pool object (not shown) encapsulated or otherwise contained in reservation request 108.

Figure 2:
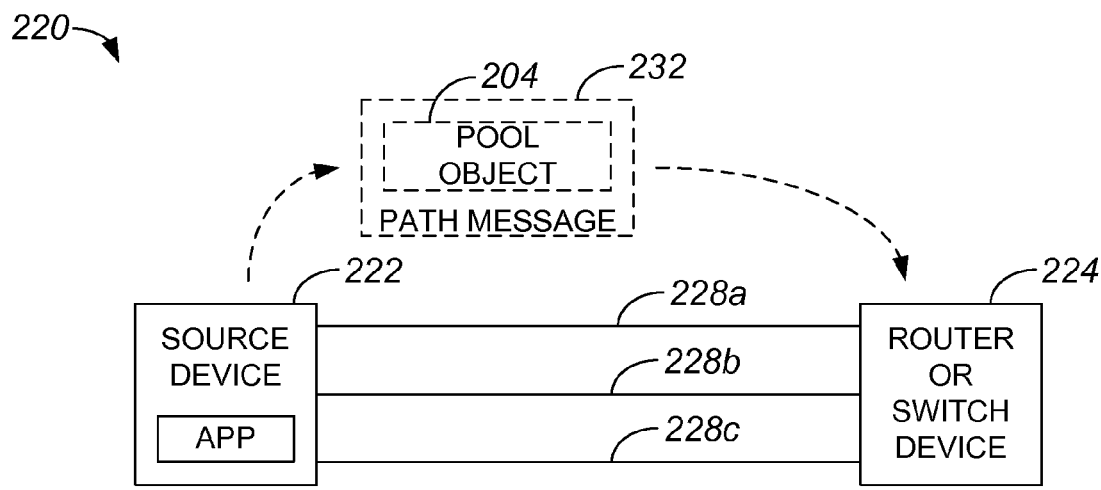
FIG. 2 is a diagrammatic representation of a network in which a source device may communicate a path message that includes a pool object in accordance with an embodiment.

A reservation request or, more generally, a PATH message that includes a pool object may be transmitted by source to a processing node processing node that is arranged to identify the pool object. FIG. 2 is a diagrammatic representation of a network in which a source device, or a source endpoint, may communicate a path message that includes a pool object to a processing node or device, e.g., an RSVP node processing node, in accordance with an embodiment. A network 220 includes a source device 222 and a processing node 224. Processing node 224 maybe a router or a switch. Source device 222 and processing node 224 may communicate over data flows path 228a-c. In one embodiment, each data path 228a-c may be associated with a different port (not shown) of source device 222.

Source device 222 may create and transmit a PATH message 232 on any of data paths 228a-c to processing node 224. Path message 232 is arranged to include a pool object 204. Upon obtaining path message 232, processing node 224 may parse path message 232 to identify pool object 204. Once pool object 204 is identified, processing node 224 may process pool object 204, as will be discussed below with reference to FIGS. 4A-D.

Once a processing node such as processing node 224 identifies a pool, the processing node may process reservations associated with the pool such that a maximum bandwidth allocated to the pool is not exceeded. With reference to FIGS. 3A-E, an example of a process of allocating bandwidth to reservations associated with a pool such that a maximum amount of bandwidth allocated to the pool is not exceeded, i.e., such that a bandwidth ceiling is not exceeded, will be described in accordance with an embodiment. A processing node 324, or a processing device, which may generally be a router or a switch, includes an input/output (I/O) arrangement 348 on which data flows from a network 320, e.g., from at least one source endpoint (not shown) within network 320, are obtained. Processing node 324 includes bandwidth reservation logic 340 that is arranged to reserve bandwidth for data flows from network 320. It should be appreciated that bandwidth reservation logic 340 is generally associated with RSVP logic (not shown). Bandwidth reservation logic 340 is also arranged to identify pool objects, to identify pools, to identify maximum pool bandwidths, and to allocate bandwidth to data flows associated with a pool such that a maximum pool bandwidth is not exceeded. A processing arrangement 344 is arranged to execute bandwidth reservation logic 340.

Figure 3A:
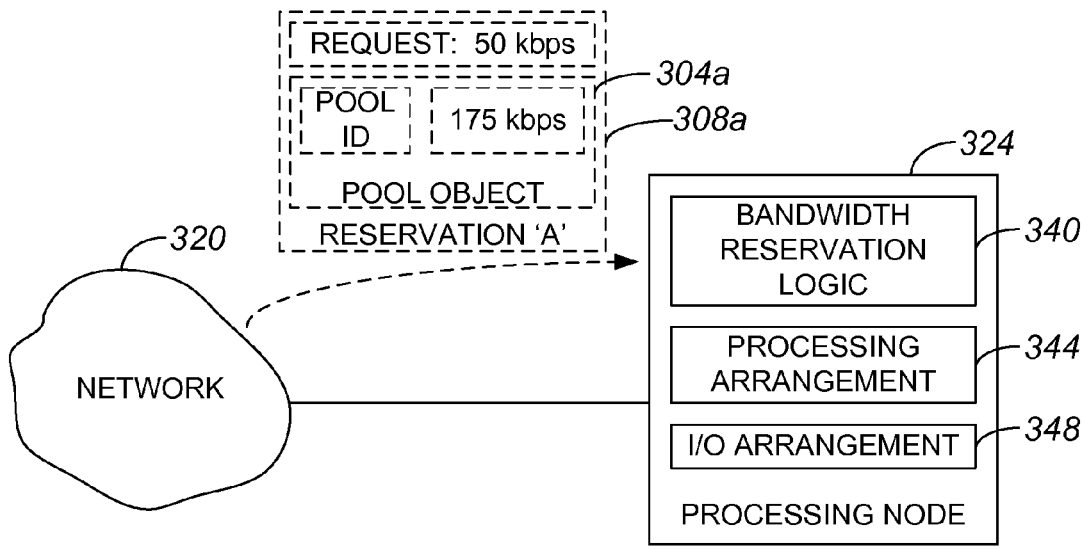
FIG. 3A is a diagrammatic representation of an environment that supports reservation pooling at a time T1 at which a first reservation is obtained in accordance with an embodiment.

At a time T1, as shown in FIG. 3A, processing node 324 obtains a reservation 'A' 308a from a source endpoint (not shown) in network 320. Reservation 'A' 308a includes a pool object 304a that contains a pool identifier and a maximum pool bandwidth. In the described embodiment, the maximum pool bandwidth is 175 kilobits per second (kbps). Reservation 'A' 308a also includes a request for bandwidth which, as shown, is a request for 50 kbps.

Upon obtaining reservation 'A' 308a, processing node 324 determines that the pool identified by the pool identifier in pool object 304a has no bandwidth allocated as yet. Thus, processing node 324 reserves approximately 50 kbps for the pool and makes note of the maximum pool bandwidth, or bandwidth ceiling, 175 kbps.

Figure 3B:
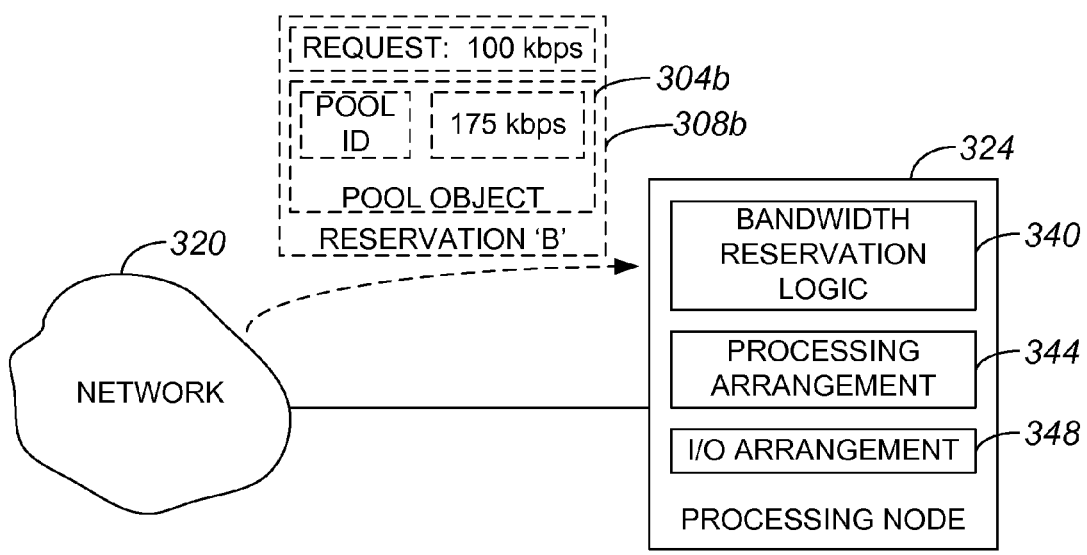
FIG. 3B is a diagrammatic representation of an environment that supports reservation pooling at a time T2 at which a second reservation is obtained in accordance with an embodiment.

At a time T2, as shown in FIG. 3B, a reservation 'B' 308b that includes a pool object 304b is obtained by processing node 324 from network 320. Processing node 324 identifies pool object 304b, and determines that the pool identifier in pool object 304b identifies reservation 'B' 308b as being part of the same pool as reservation 'A' 308a of FIG. 3A. Processing node 324 also determines that reservation 'B' 308b requests 100 kbps, and that allocating approximately 100 kbps to reservation 'B' 308b will not cause the maximum pool bandwidth for the pool to be reached. As such, processing node 324 reserves approximately 100 kbps to reservation 'B' 308b, and effectively increases the reserved bandwidth of the pool to approximately 150 kpbs.

Figure 3C:
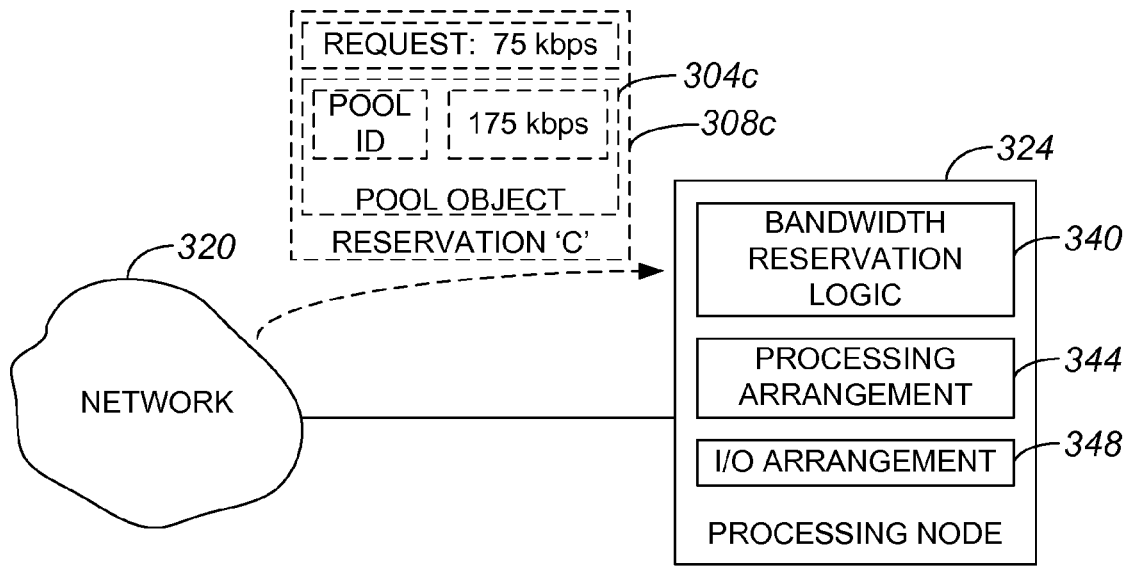
FIG. 3C is a diagrammatic representation of an environment that supports reservation pooling at a time T3 at which a third reservation is obtained in accordance with an embodiment.

FIG. 3C is a diagrammatic representation of processing node 324 obtaining a reservation 'C' 308c associated with the same pool as reservation 'B' 308b of FIG. 3B and reservation 'A' 308a of FIG. 3A at a time T3 in accordance with an embodiment. At time T3, processing node 324 obtains reservation 'C' 308c and ascertains from a pool object 304c that reservation 'C' 308c is associated with the same pool as reservation 'B' 308b of FIG. 3B and reservation 'A' 308a of FIG. 3A. Processing node 324 also ascertains that reservation 'C' 308c contains a request to reserve 75 kbps.

As the maximum pool bandwidth for the pool is 175 kbps, and approximately 150 kbps has previously been allocated to the pool, processing node 324 determines that the entire reservation requested by reservation 'C' 308c may not be allocated without exceeding the maximum pool bandwidth of 175 kbps. Thus, processing node 324 does no reserve the entire amount requested by reservation 'C' 308c, and processing node 324 instead reserves approximately 25 kbps in response to reservation 'C' 308c. In reserving approximately 25 kbps for reservation 'C' 308c, the reservation for the pool is increased to approximately 175 kpbs, or the maximum pool bandwidth.

It should be appreciated that the pool, e.g., a source endpoint or an application associated with the pool, may reallocate the bandwidth allocated to the pool such that reservation 'C' 308c may utilize more than approximately 25 kbps, and either or both reservation 'B' 308b of FIG. 3B and reservation 'A' 308a of FIG. 3A may utilize less than their respective bandwidth allocations. That is, once the maximum pool bandwidth for a pool has been reserved, the bandwidth may effectively be re-distributed for the flows in the pool by the application.

Figure 3D:
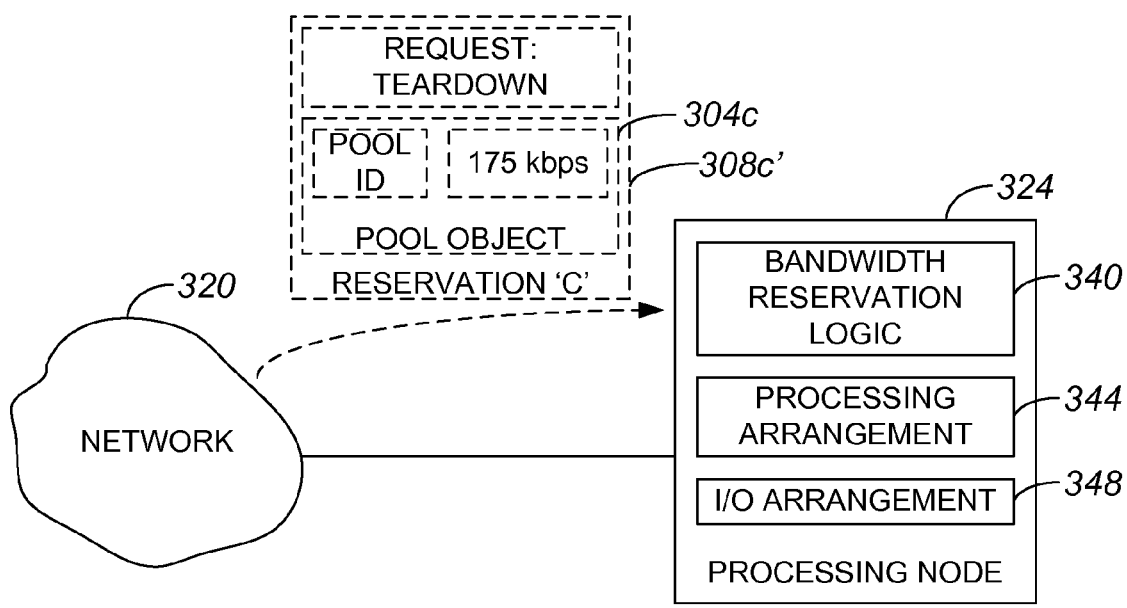
FIG. 3D is a diagrammatic representation of an environment that supports reservation pooling at a time T4 at which a third reservation, e.g., third reservation 308c of FIG. 3C, is to be torn down in accordance with an embodiment.

In the described embodiment, at a time T4 as shown in FIG. 3D, a request to teardown reservation 'C' 308c of FIG. 3C is obtained by processing node 324. A request to teardown reservation 'C' 308c' is obtained by processing node 324 at time T4, and processing node 324 determines from pool object 304c that request to teardown reservation 'C' 308c' is associated with the pool for which 175 kbps has previously been reserved. It should be appreciated that request to teardown reservation 'C' 308c' is effectively a request to release or relinquish bandwidth reserved for reservation 'C' 308c of FIG. 3C.

Processing node 324 determines that after reservation 'C' 308c of FIG. 3C is torn down, reservation 'B' 308b of FIG. 3B and reservation 'A' 308a of FIG. 3A are still in effect. Thus, processing node 324 notes that a total of approximately 150 kbps of bandwidth is still needed by the pool. Accordingly, processing node 324 maintains a reservation for approximately 150 kbps after tearing down reservation 'C' 308c of FIG. 3C in response to request to teardown reservation 'C' 308c'. That is, the teardown of reservation 'C' 308c of FIG. 3C results in the reserved bandwidth for the pool being reduced from approximately 175 kbps to approximately 150 kbps.

Figure 3E:
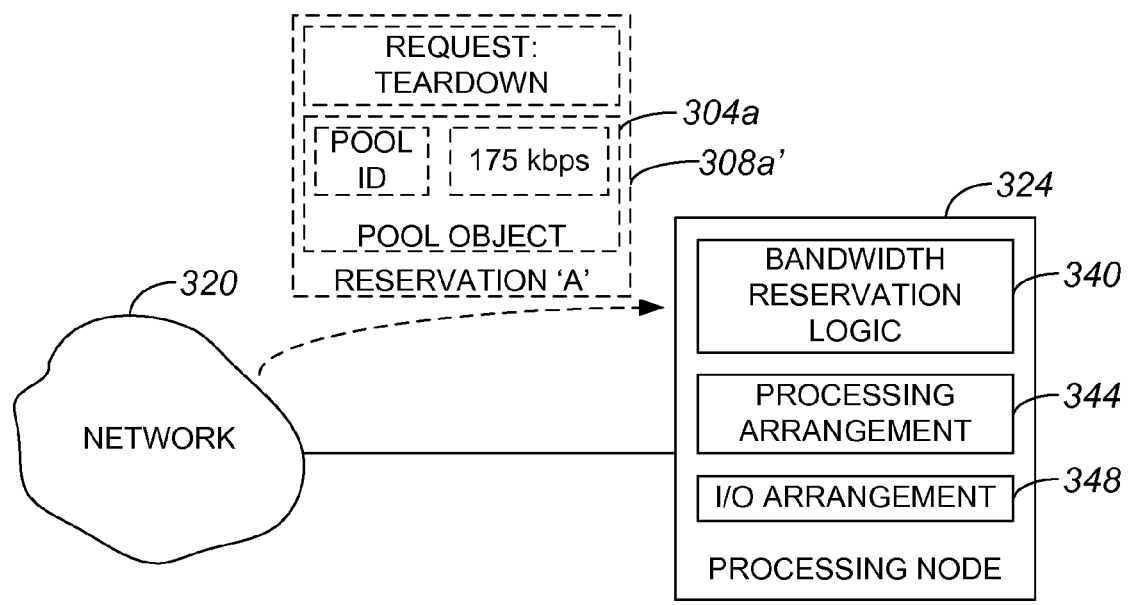
FIG. 3E is a diagrammatic representation of an environment that supports reservation pooling at a time T5 at which a first reservation, e.g., first reservation 308a of FIG. 3A, is to be torn down in accordance with an embodiment.
Figure 4A:
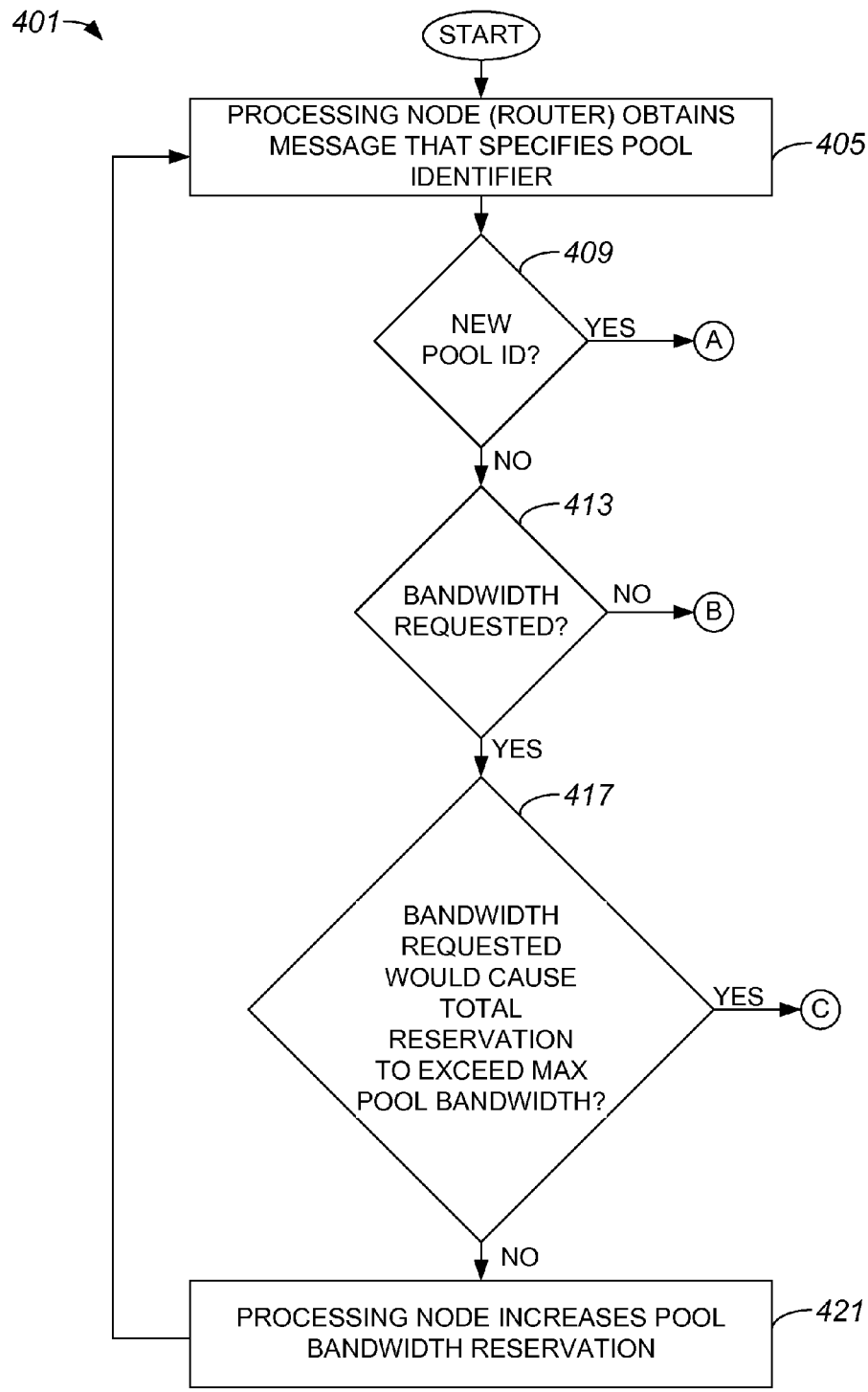
FIGS. 4A-D are a process flow diagram which illustrates a method of processing reservation requests in an environment that supports reservation pooling in accordance with an embodiment.
Figure 4B:
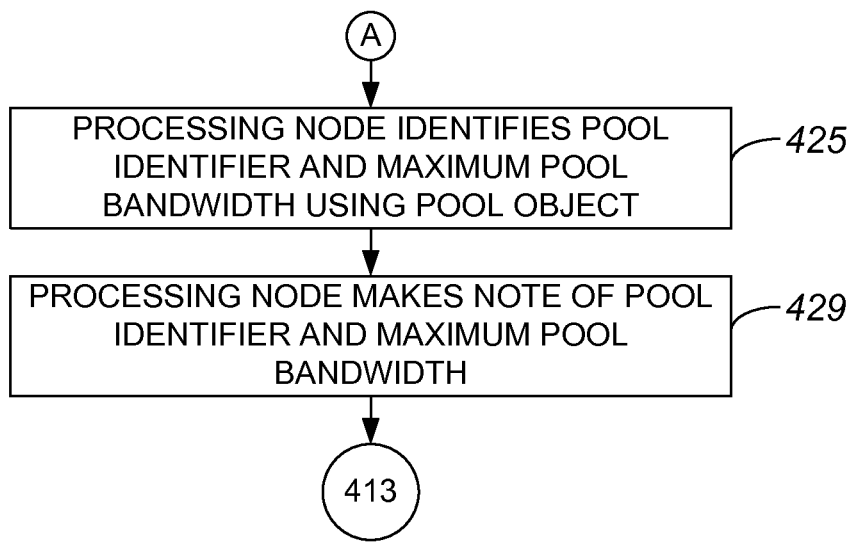
Figure 4C:
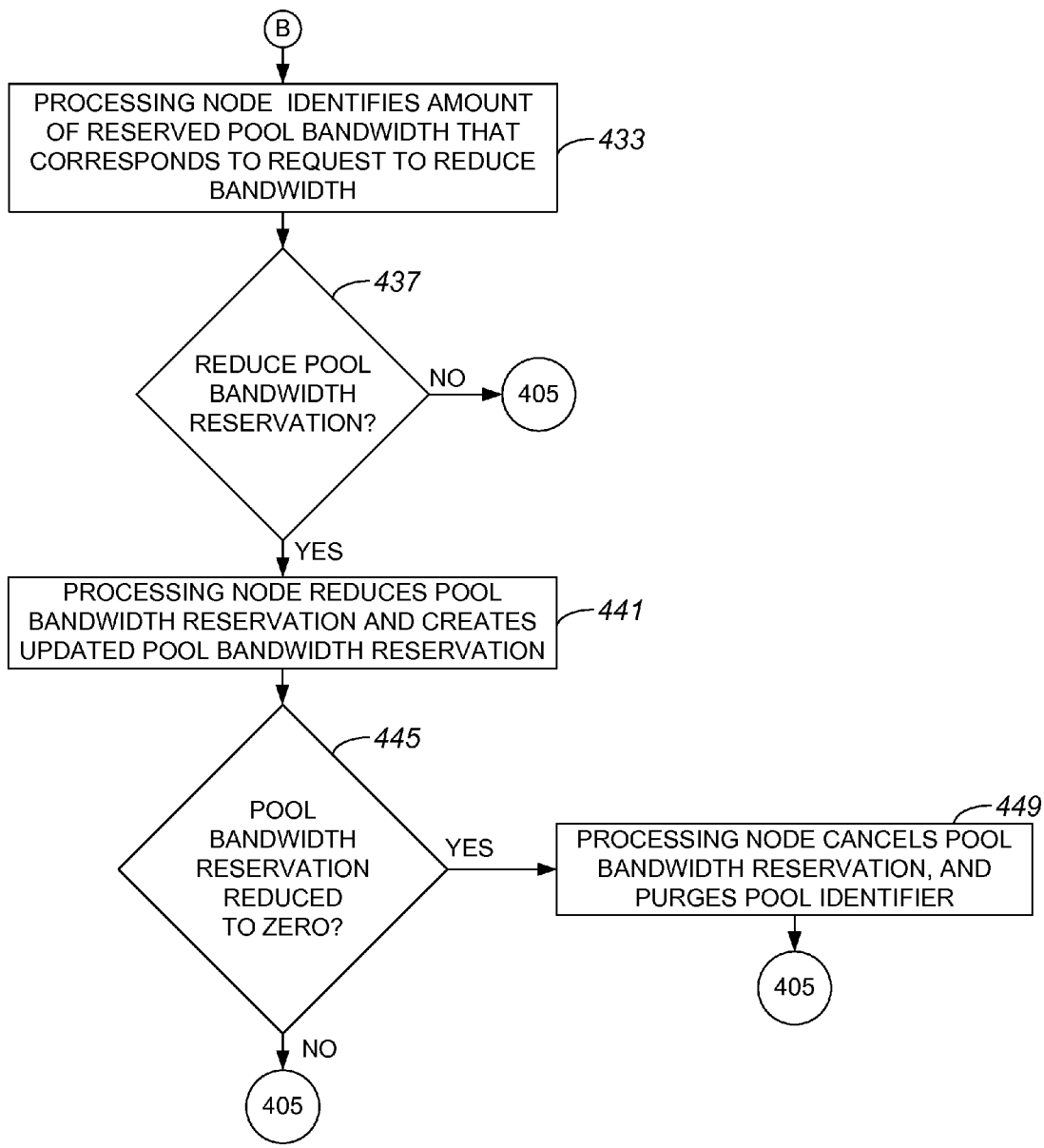
Figure 4D:
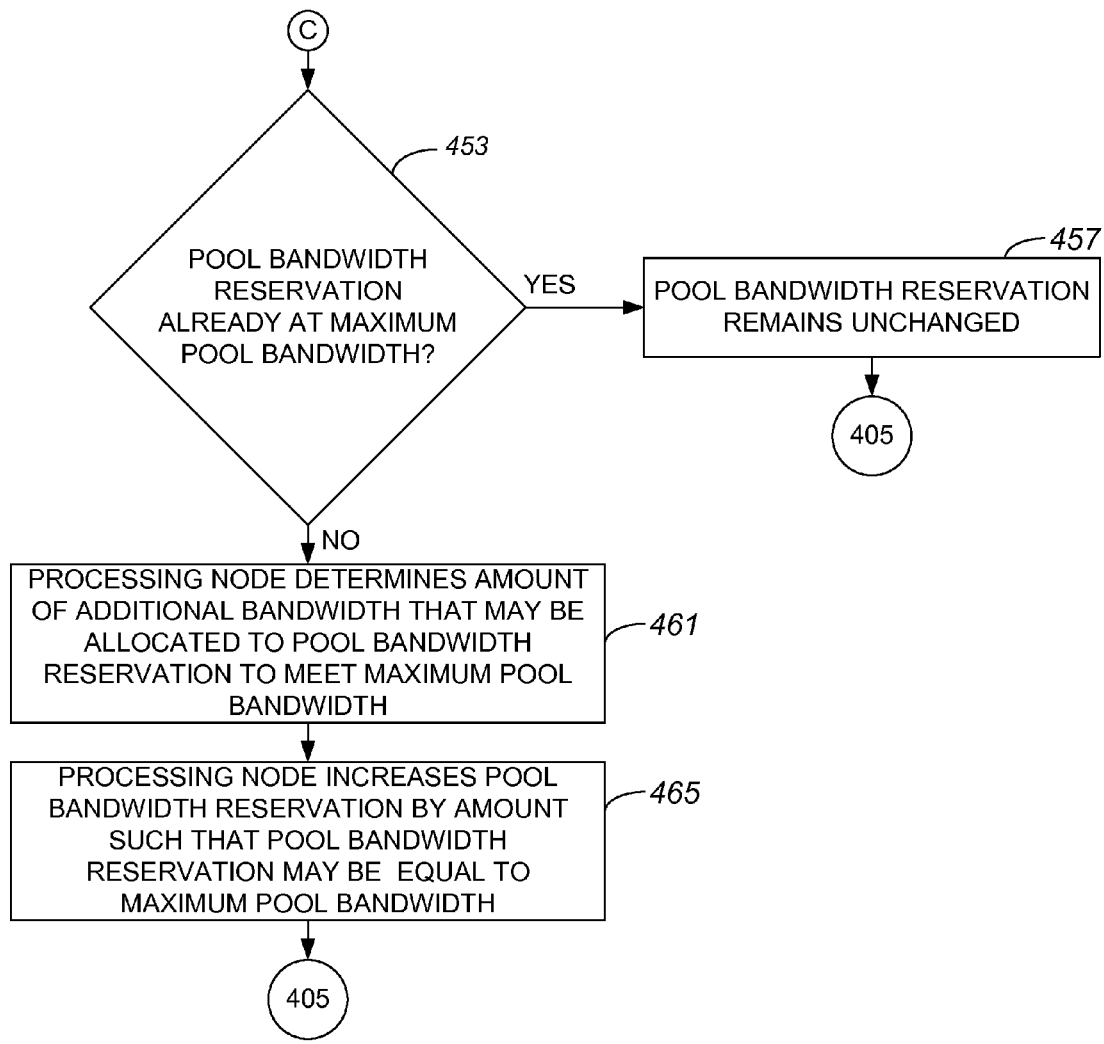

At a time T5, as shown in FIG. 3E, a request to teardown reservation 'A' 308a of FIG. 3A is obtained by processing node 324. Processing node 324 determines from pool object 304a in request to teardown reservation 'A' 308a' that request to teardown reservation 'A' 308a' is associated with the pool for which 150 kbps is currently reserved.

Processing node 324 determines that after reservation 'A' 308a of FIG. 3A is torn down, reservation 'B' 308b of FIG. 3B will still be in effect for the pool. Thus, processing node 324 notes that a total of approximately 100 kbps of bandwidth, which was requested by reservation 'B' 308b of FIG. 3B, is still needed by the pool. Therefore, processing node 324 maintains a reservation for approximately 100 kbps after tearing down reservation 'A' 308a of FIG. 3A in response to request to teardown reservation 'A' 308a'. In other words, the teardown of reservation 'A' 308a of FIG. 3A results in the reserved bandwidth for the pool being reduced from approximately 150 kbps to approximately 100 kbps.

Referring next to FIGS. 4A-D, a method of processing reservation requests in an environment that supports reservation pooling in accordance with an embodiment. A process 401 of processing a reservation request begins at step 405 in which a processing node such as a router, while operating, obtains a message, e.g., a reservation request, that specifies a pool identifier. As described above, the pool identifier is included in a pool object. Once a message that specifies a pool identifier is obtained, a determination is made in step 409 as to whether the pool identifier is a new pool identifier. In one embodiment, determining whether a pool identifier is a new pool identifier includes ascertaining whether the pool identified by the pool identifier has previously been identified by the processing node and been allocated bandwidth.

If the determination in step 409 is that the pool identifier is not new, the implication is that some amount of bandwidth may already be reserved for the pool identified by the pool identifier. From step 409, process flow moves to step 413 in which it is determined whether the message includes a request for bandwidth. If it is determined that the message includes a request for bandwidth, a determination is made in step 417 as to whether allocating the amount of bandwidth requested would cause the overall amount of bandwidth reserved for the pool identified by the pool identifier to exceed the pool bandwidth. That is, it is determined in step 417 whether allocating substantially the entire amount of bandwidth requested in the message would cause the overall pool bandwidth reservation to exceed the maximum pool bandwidth.

If it is determined in step 417 that reserving substantially the entire amount of bandwidth requested in the message, i.e., the message obtained in step 405, would not cause the total pool bandwidth reservation to exceed the maximum pool bandwidth, then, in step 421, the processing node increases the pool bandwidth reservation. After the pool bandwidth reservation is increased, the processing node continues to operate, and process flow returns to step 405 in which the processing node obtains another message that specifies a pool identifier.

Alternatively, if the determination in step 417 is that allocating the amount of bandwidth requested would result in the overall amount of reserved bandwidth to exceed the maximum pool bandwidth, the indication is that the entire amount of bandwidth requested may not be allocated. A determination is made in step 453 as to whether the pool bandwidth reservation is already approximately at the maximum pool bandwidth. If it is determined that the pool bandwidth reservation is already substantially at the maximum pool bandwidth, the pool bandwidth reservation remains unchanged at step 457, as the pool bandwidth reservation may not be increase. Process flow then returns to step 405 in which the processing node, while operating, obtains another message that specifies a pool identifier.

If, however, the determination in step 453 is that the pool bandwidth reservation is not already at a maximum pool bandwidth, the processing node determines an amount of additional bandwidth that may be allocated to the pool bandwidth reservation in step 461 such that the maximum pool bandwidth is substantially met but not exceeded. The amount of additional bandwidth that may be reserved in response to the message obtained in step 405 is generally determined to be the largest amount that may be allocated without causing the pool bandwidth reservation to exceed the maximum pool bandwidth. Once the processing node determines the amount of additional bandwidth that may be allocated to the pool bandwidth reservation, the processing node increases the pool bandwidth reservation in step 465 by an amount such that the pool bandwidth reservation may approximately equal the maximum pool bandwidth. After the poll bandwidth reservation is increased by the processing node, the processing node continues to operate, and process flow returns to step 405 in which another message that specifies a pool identifier is obtained.

Returning to step 413 and the determination of whether the message obtained in step 405 contains a request for a bandwidth reservation, if the determination is that the message does not include a request for bandwidth, then the indication is that the message includes a request to teardown a bandwidth reservation, or a request to reduce bandwidth associated with a pool. Accordingly, process flow moves from step 413 to step 433 in which the processing node identifies an amount of reserved pool bandwidth that corresponds to the request to reduce, or to otherwise release, bandwidth. In one embodiment, the processing node may identify the source of the request to reduce bandwidth, determine how much bandwidth the source previously requested, and determine an appropriate amount, if any, by which to reduce the pool bandwidth reservation. As will be appreciated by those skilled in the art, an appropriate amount by which to reduce the pool bandwidth reservation may range between approximately zero and approximately an entire amount previous requested by the source. For example, if enough bandwidth has been requested that even tearing down one reservation would result in the amount of bandwidth requested exceeding the maximum pool bandwidth, the amount by which the reserved pool bandwidth is to be reduced in response to the request to reduce bandwidth may be approximately zero.

A determination is made in step 437 as to whether the pool bandwidth reservation is to be reduced. If the determination is that the pool bandwidth reservation is not to be reduced, the indication is that the overall amount of requested bandwidth is still approximately equal to or greater than the maximum pool bandwidth. Accordingly, the processing node continues to operate, and process flow returns to step 405 in which another message that specifies a pool identifier is obtained.

Alternatively, if the determination in step 437 is that the pool bandwidth reservation is to be reduced, the endpoint reduces the pool bandwidth reservation as appropriate, e.g., by the amount determined in step 433, in step 441. As a result, an updated pool bandwidth reservation is created.

After an updated pool bandwidth reservation is created, it is determined in step 445 whether the pool bandwidth reservation is reduced to approximately zero. In other words, it is determined whether the updated pool bandwidth reservation is a reservation for approximately no bandwidth. If it is determined in step 445 that the pool bandwidth reservation is not reduced to approximately zero, the processing node continues to operate, and process flow returns to step 405 in which another message that specifies a pool identifier is obtained. If, however, it is determined in step 445 that the pool bandwidth reservation is reduced to approximately zero, the processing node tears down the pool bandwidth reservation, and may purge the pool identifier in step 449. Purging the pool identifier may enable the pool identifier to be processed as a new pool identifier in the event that the pool identifier is obtained in a later message. From step 449, process flow returns to step 405 in which the processing node continues to operate, and another message that specifies a pool identifier is obtained.

Returning to step 409 and the determination of whether the pool identifier contained in the message is a new pool identifier, e.g., a pool identifier that the processing node presently holds no reservations for, if the determination in step 409 that the pool identifier is new, then the processing node identifies the pool identifier and a maximum pool bandwidth in step 425 using a pool object included in the message, i.e., the message obtained in step 405. It should be appreciated that if the pool identifier is new, the indication is that the message includes a pool object such that the processing node may be made aware of the maximum pool bandwidth. After the pool identifier and the maximum pool bandwidth are identified, the processing node makes note of the pool identifier and the maximum pool bandwidth in step 428, and process flow proceeds to step 413 in which it is determined whether bandwidth is requested in the message.

Figure 5:
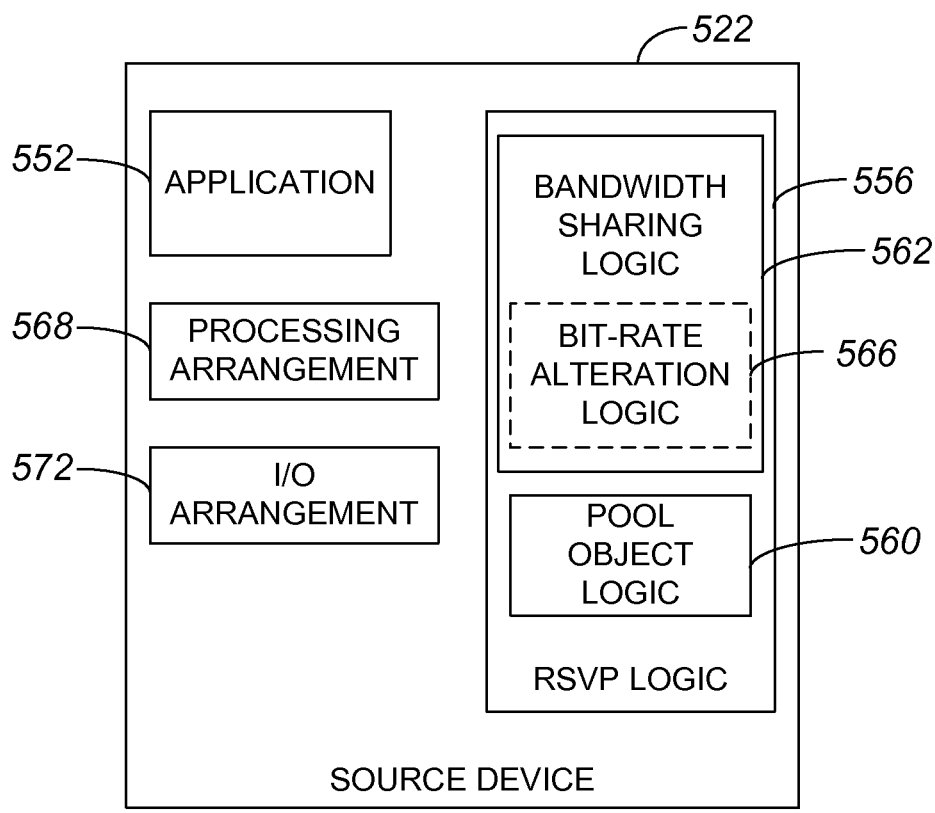
FIG. 5 is a block diagram representation of a source device that supports the creation of a pool object within an environment that supports reservation pooling in accordance with an embodiment.

A source endpoint that originates a message, e.g., a reservation request, that includes a pool object will be described with respect to FIG. 5. FIG. 5 is a block diagram representation of a source device that supports the creation of a pool object within an environment that supports reservation pooling in accordance with an embodiment. A source endpoint or device 522 may generally be a computing system. Device 522 includes an I/O arrangement 572 that allows data flows to be transmitted by device 522 over links (not shown), e.g., data or network links, to a processing node (not shown). Device also includes a processing arrangement 568 and at least one application 552. Application 552 may generally utilize resource reservations to obtain sufficient bandwidth for its data associated with application 552. In one embodiment, application 552 may be a telepresence application that reserves resources, e.g., audio and video resources, associated with the telepresence application.

Device 522 may include RSVP logic 556 that generally supports RSVP functionality. In one embodiment, RSVP logic 556 is effectively arranged to create a single logical reservation that includes multiple discrete reservation requests and associated data flows. RSVP logic 556 includes bandwidth sharing logic 562 and pool object logic 560.

Bandwidth sharing logic 562 allows multiple data flows, e.g., multiple data flows associated with multiple applications and/or multiple devices, associated with a pool to share reserved bandwidth. Bandwidth sharing logic 562 includes bit-rate alteration logic 566 that allows one data flow of a pool to utilize an increased amount of bandwidth while another data flow of the pool utilizes a decreased amount of bandwidth, as long as the total amount of bandwidth associated with the pool does not exceed a maximum pool bandwidth. That is, bit-rate alteration logic 566 generally allows bit-rates of data flows associated with a pool to be adjusted without additional signaling to the network as long as the total reserved bandwidth utilized by the data flows does not exceed a maximum pool bandwidth. In one embodiment, the amount by which bit-rates are increased and decreased may depend upon the requirements and/or specifications associated with application 552.

In one embodiment, pool object logic 560 is arranged to create pool objects that are included in messages, e.g., PATH messages such as RSVP reservation requests, transmitted by source device 522. Pool object logic 560 creates pool objects such that the pool objects specify a pool identifier that identifies a particular pool and a maximum pool bandwidth. The maximum pool bandwidth is generally the maximum amount of bandwidth that may be reserved for a logical reservation that includes multiple discrete reservations.

Figure 6:
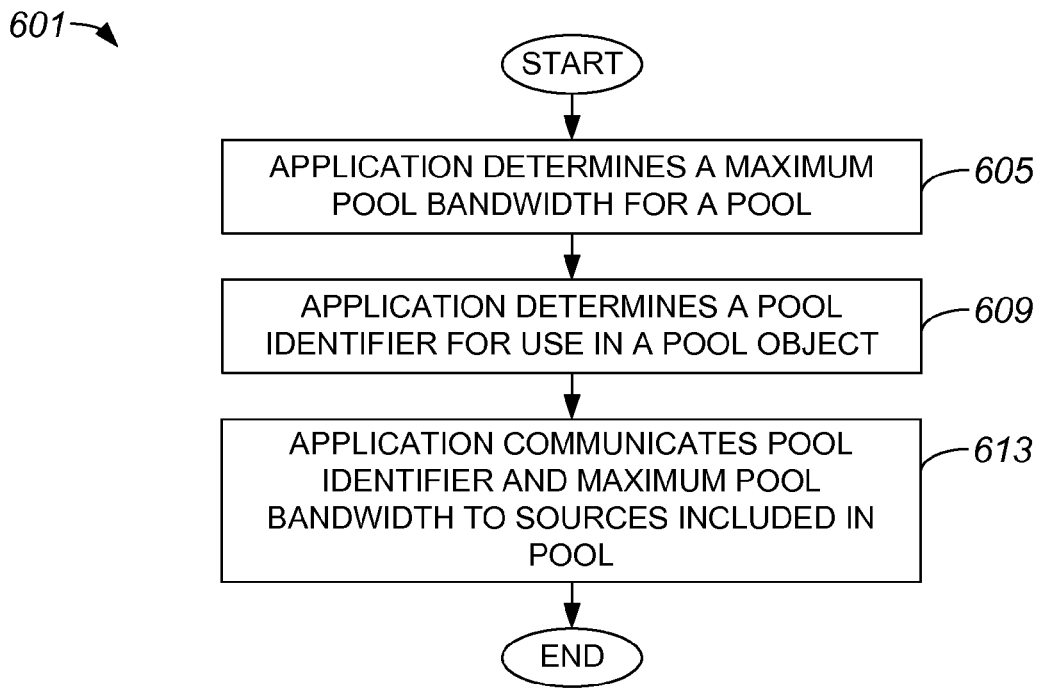
FIG. 6 is a process flow diagram which illustrates a process of obtaining information for use in creating a pool object in accordance with an embodiment.

FIG. 6 is a process flow diagram which illustrates a process of obtaining information for use in creating a pool object in accordance with an embodiment. A method 601 of obtaining information for use in creating a pool object begins at step 605 in which an application or, more generally, a device on which the application is executing determines a maximum amount of pool bandwidth for a pool. Determining a maximum amount of pool bandwidth may include, but is not limited to including, ascertaining a total amount of bandwidth that is likely to be needed by the pool, determining an amount of bandwidth that is likely to exceed the average amount used at any given time by the pool, and/or determining an amount of bandwidth that has previously been sufficient to accommodate the needs of the pool. Upon determining the maximum pool bandwidth for the pool, the application determines a pool identifier for use in uniquely identifying a pool object in step 609. After the maximum pool bandwidth and the pool identifier are determined, the application may communicate the maximum pool bandwidth and the pool identifier to sources included in the pool in step 613. Such communication may allow sources associated with a pool to become aware of the pool identifier, as well as of the maximum pool bandwidth for the pool. Once the pool identifier and the maximum pool bandwidth are communicated, the method of obtaining information for use in a pool object is completed.

Figure 7:
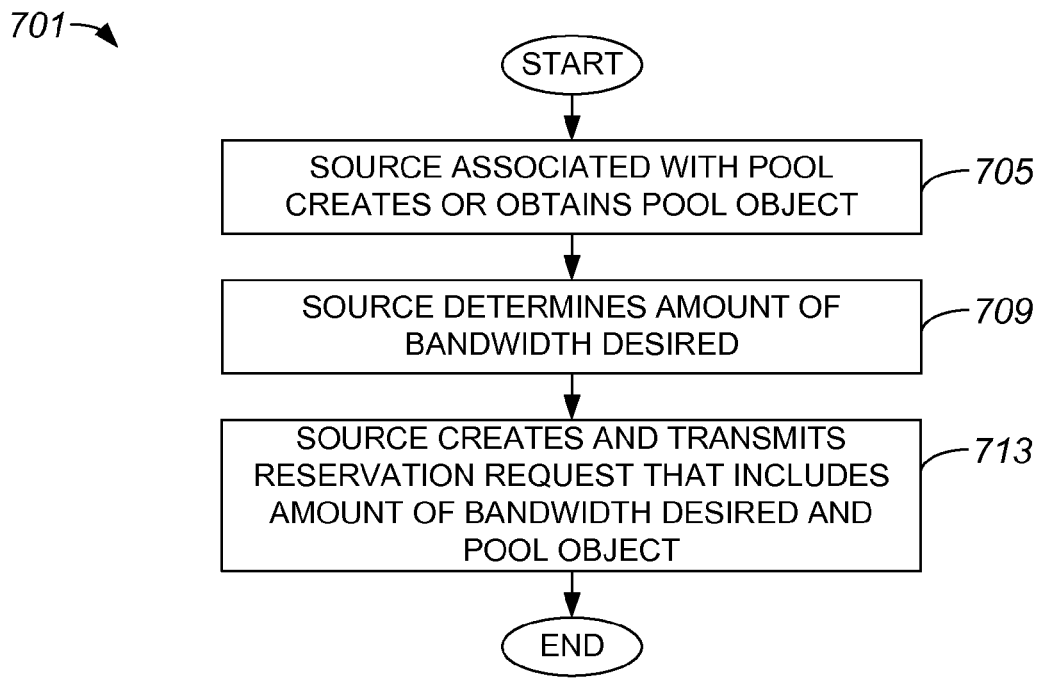
FIG. 7 is a process flow diagram which illustrates a method of conveying information relating to a pool in accordance with an embodiment.

Referring next to FIG. 7, a method of conveying information relating to a pool, e.g., transmitting information relating to a pool, will be described in accordance with an embodiment. A method 701 of conveying information relating to a pool begins at step 705 in which a source node associated with a pool creates or otherwise obtains a pool object. The pool object may be created or obtained when a reservation request is to be transmitted. Once the source creates the pool object, the source determines an amount of bandwidth desired by the source for a particular reservation, or a bandwidth amount to be requested, in step 709. Finally, the source creates a reservation request in step 713 that includes the amount of bandwidth desired and the pool object. After the source creates the reservation request, the reservation request is transmitted, and the method of conveying information relating to a pool is completed. It should be appreciated that if a source node creates a pool object on behalf of an application, the application generally needs to be informed of the pool object in order for the application to share information with sources and/or destinations.

Although only a few embodiments have been described in this disclosure, it should be understood that the disclosure may be embodied in many other specific forms without departing from the spirit or the scope of the present disclosure. By way of example, while the use of a pool object has been described as being suitable for use within RSVP, it should be appreciated that a pool object is not limited to being used within RSVP. In general, a pool object may be applied to any suitable reservation protocol, e.g., NSIS, or tunneling protocol, e.g., MPLS.

Bandwidth pooling objects may be used, in one embodiment, in a PATH message such as a PATH message that that lacks a globally unique identifier. In addition, a remote terminal may assign an identifier in a RESV message. In RSVP, reservations are generally made at the time that an RESV message is transmitted, not when a PATH message is transmitted. Outside of RSVP, bandwidth may be reserved via an initial request message. It should be appreciated that in the figures set forth above, a reservation 'A', for example, may be made by a receiving terminal via a RESV message. In addition, it should be appreciated that a PATH message may not, in some instances, contain a bandwidth pooling identifier in a bandwidth pooling object.

Discrete reservations in a pool may have substantially the same priority such that a first discrete reservation that is processed by a processing node has precedence over a second discrete reservation that is obtained after the first discrete reservation is obtained. In one embodiment, discrete reservations in a pool may have different priorities such that some reservations may be allocated bandwidth before other reservations are allocated bandwidth, when there is insufficient bandwidth to provide the requested bandwidth for all reservations. Any suitable method may generally be used to determine how much bandwidth to allocate to each reservation. Additionally, with different priorities assigned to different reservations within the same pool, it may be possible to have another network congestion event cause one or more reservations within a pool to cease, e.g., be torn down, while the remaining reservations within this same pool remain operational at the current bandwidth for each reservation or at a reduced bandwidth for each reservation.

Pools may be assigned priorities such that one pool may have precedence over another pool. For instance, if there is insufficient bandwidth to allocate a maximum amount of pool bandwidth to a first pool and to a second pool, when the first pool has precedence over the second pool, the maximum amount of pool bandwidth may be reserved for the first pool while the second pool may reserve any remaining amount of bandwidth that is available. Alternatively, when there is insufficient bandwidth to accommodate a plurality of pools, the bandwidth may instead be shared between the pools, and the amount of bandwidth reserved for each pool may be allocated based on any suitable criteria.

A processing node may be arranged to process reservations that are associated with a pool as having a higher priority than reservations that are not associated with a pool. That is, bandwidth reservations received with respect to a pool may be processed with precedence over bandwidth reservations that are not associated with any pool.

As mentioned above, a pool object may contain, e.g., specify, a maximum bandwidth. In one embodiment, a first PATH message may set a maximum bandwidth parameter value for a pool. In another embodiment, a RESV message may set a maximum bandwidth parameter value for a pool. It should be appreciated that substantially all reservations using the same pool identifier may have approximately the same maximum bandwidth parameter value. Alternatively, reservations using the same pool identifier may have different maximum bandwidth parameter values. When reservations have different maximum bandwidth parameter values, a local configuration may determine how the different maximum bandwidth parameters values may be handled. For example, a highest maximum bandwidth may be set in a RESV message or refreshed, a first PATH message may effectively be set, or each PATH message that sets different values may increment up to a maximum bandwidth value.

Typically, if there is a pool object in a PATH message, then a corresponding RESV message contains a pool object. On the other hand, if a PATH message does not contain a pool object, then a generator of an RESV message may insert a pool object if a pool object is desired.

A maximum bandwidth may be multi-dimensional such that one or more elements of a multi-dimensional object may be considered for processing. By way of example, peak, bust, and/or average bandwidths may be considered for processing. It should be appreciated that when an RSVP node that obtains a message containing a pool object does not recognize pool objects, the RSVP node may effectively ignore the pool object. In other words, when a pool object contained in a message is not recognized as being a pool object, the message is typically processed as if the message is not associated with a pool.

In general, substantially all requests for bandwidth that include a pool object which identifies a particular pool identifier specify the same maximum pool bandwidth. When different requests for bandwidth identify the same pool identifier but different maximum pool bandwidths, a router may make assumptions as to which maximum pool bandwidth is correct, or act on local policy within a network domain in such occurrences. By way of example, a router may determine that the most recently obtained maximum pool bandwidth is correct. Alternatively, the router may determine that the greatest value for the maximum pool bandwidth is correct, or that the lowest value for the maximum pool bandwidth is correct. When values for a maximum pool bandwidth differ, the selection of which value to use may vary depending upon the specifications and/or requirements of an overall system. Any suitable criteria may be used to determine which value to use as a maximum pool bandwidth, when different values are obtained.

The embodiments may be implemented as hardware and/or software logic embodied in a tangible medium that, when executed, e.g., by a processing system associated with a host device and/or a headset, is operable to perform the various methods and processes described above. That is, the logic may be embodied as physical arrangements, modules, or components. A tangible medium may be substantially any suitable physical, computer-readable medium that is capable of storing logic which may be executed, e.g., by a processing system such as a computer system, to perform methods and functions associated with the embodiments. Such computer-readable media may include, but are not limited to including, physical storage and/or memory devices. Executable logic may include code devices, computer program code, and/or executable computer commands or instructions that may be embodied on computer-readable media.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
obtaining a first message associated with a first data flow, the first message including a first indicator that identifies a first amount of requested pool bandwidth and a second indicator that identifies a pool with which the first data flow is associated, wherein the pool is associated with a plurality of data flows that includes the first data flow;
determining whether the pool identified by the second indicator has an overall pool bandwidth allocation;
determining whether reserving the first amount of requested bandwidth would cause the overall pool bandwidth allocation to exceed a maximum pool bandwidth allocation associated with the pool when it is determined that the pool identified by the second indicator has the overall pool bandwidth allocation;
reserving the first amount of requested bandwidth when it is determined that reserving the first amount of requested bandwidth would not cause the overall pool bandwidth allocation to exceed the maximum pool bandwidth allocation associated with the pool, wherein reserving the first amount of requested bandwidth includes increasing the overall pool bandwidth allocation by the first amount of requested bandwidth;
determining whether the overall pool bandwidth allocation is equal to the maximum pool bandwidth allocation when it is determined that reserving the first amount of requested bandwidth would cause the overall pool bandwidth allocation to exceed the maximum pool bandwidth allocation;
reserving no amount of the first amount of requested bandwidth when it is determined that the overall pool bandwidth allocation is equal to the maximum pool bandwidth allocation;
determining a portion of the first amount of requested bandwidth to reserve when it is determined that the overall pool bandwidth allocation is not approximately equal to the maximum pool bandwidth allocation, wherein the portion of the first amount is less than or equal to a difference between the maximum pool bandwidth allocation and the overall pool bandwidth allocation; and
reserving the portion of the first amount of requested bandwidth when it is determined that the overall pool bandwidth allocation is not equal to the maximum pool bandwidth allocation, wherein reserving the portion of the first amount of requested bandwidth includes increasing the overall pool bandwidth allocation by the portion of the first amount of requested bandwidth.

2. The method of claim 1 wherein a reserved amount is one selected from a group including the first amount of requested bandwidth and the portion of the first amount of requested bandwidth, the method further including:
obtaining a second message associated with the first data flow, the second message including a third indicator that identifies the pool with which the first data flow is associated and a fourth indicator, the fourth indicator being arranged to indicate that at least a part of the reserved portion is to be torn down;

determining whether to tear down all of the reserved amount;

tearing down all of the reserved portion if it is determined that all of the reserved portion is to be torn down, wherein tearing down all of the reserved portion includes releasing all of the reserved amount;

decreasing the overall pool bandwidth allocation by the reserved amount; and determining whether to decrease a bandwidth allocation associated with at least one reservation associated with the pool.

3. The method of claim 1 wherein the first message is a first resource reservation protocol (RSVP) reservation request, and the pool is associated with a plurality of discrete RSVP requests including the first RSVP reservation request, the plurality of discrete RSVP requests being arranged to share the overall pool bandwidth allocation.

4. The method of claim 3 wherein the first RSVP reservation request includes a pool object, and wherein the pool object includes the second indicator and a third indicator, the third indicator being arranged to specify the maximum pool bandwidth allocation.

5. The method of claim 3 wherein the plurality of discrete RSVP requests are associated with a single source endpoint, the single source endpoint being arranged to transmit the first RSVP reservation request.

6. The method of claim 3 wherein the plurality of discrete RSVP requests are associated with a plurality of source endpoints including a first source, the first source endpoint being arranged to cause the first RSVP reservation request to be transmitted.

7. An apparatus comprising:
means for obtaining a first message associated with a first data flow, the first message including a first indicator that identifies a first amount of requested pool bandwidth and a second indicator that identifies a pool with which the first data flow is associated, wherein the pool is associated with a plurality of data flows that includes the first data flow;

means for determining whether the pool identified by the second indicator has an overall pool bandwidth allocation;

means for determining whether reserving the first amount of requested bandwidth would cause the overall pool bandwidth allocation to exceed a maximum pool bandwidth allocation associated with the pool when it is determined that the pool identified by the second indicator has the overall pool bandwidth allocation;

means reserving the first amount of requested bandwidth when it is determined that reserving the first amount of requested bandwidth would not cause the overall pool bandwidth allocation to exceed the maximum pool bandwidth allocation associated with the pool, wherein the means for reserving the first amount of requested bandwidth include means for increasing the overall pool bandwidth allocation by the first amount of requested bandwidth;

means for determining whether the overall pool bandwidth allocation is equal to the maximum pool bandwidth allocation when it is determined that reserving the first amount of requested bandwidth would cause the overall pool bandwidth allocation to exceed the maximum pool bandwidth allocation;

means for reserving no amount of the first amount of requested bandwidth when it is determined that the overall pool bandwidth allocation is equal to the maximum pool bandwidth allocation;

means for determining a portion of the first amount of requested bandwidth to reserve when it is determined that the overall pool bandwidth allocation is not approximately equal to the maximum pool bandwidth allocation, wherein the portion of the first amount is less than or equal to a difference between the maximum pool bandwidth allocation and the overall pool bandwidth allocation; and means for reserving the portion of the first amount of requested bandwidth when it is determined that the overall pool bandwidth allocation is not equal to the maximum pool bandwidth allocation, wherein the means for reserving the portion of the first amount of requested bandwidth include means for increasing the overall pool bandwidth allocation by the portion of the first amount of requested bandwidth.

8. Logic embodied in a tangible, non-transitory computer readable medium, when executed, configured to:
obtain a first message associated with a first data flow, the first message including a first indicator that identifies a first amount of requested pool bandwidth and a second indicator that identifies a pool with which the first data flow is associated, wherein the pool is associated with a plurality of data flows that include the first data flow;

determine whether the pool identified by the second indicator has an overall pool bandwidth allocation;

determine whether reserving the first amount of requested bandwidth would cause the overall pool bandwidth allocation to exceed a maximum pool bandwidth allocation associated with the pool when it is determined that the pool identified by the second indicator has the overall pool bandwidth allocation; and reserve the first amount of requested bandwidth when it is determined that reserving the first amount of requested bandwidth would not cause the overall pool bandwidth allocation to exceed the maximum pool bandwidth allocation associated with the pool, wherein the logic configured to reserve the first amount of requested bandwidth is further configured to increase the overall pool bandwidth allocation by the first amount of requested bandwidth;

determine whether the overall pool bandwidth allocation is equal to the maximum pool bandwidth allocation when it is determined that reserving the first amount of requested bandwidth would cause the overall pool bandwidth allocation to exceed the maximum pool bandwidth allocation;

reserve no amount of the first amount of requested bandwidth when it is determined that the overall pool bandwidth allocation is equal to the maximum pool bandwidth allocation;

determine a portion of the first amount of requested bandwidth to reserve when it is determined that the overall pool bandwidth allocation is not approximately equal to the maximum pool bandwidth allocation, wherein the portion of the first amount is less than or equal to a difference between the maximum pool bandwidth allocation and the overall pool bandwidth allocation; and reserve the portion of the first amount of requested bandwidth when it is determined that the overall pool bandwidth allocation is not equal to the maximum pool bandwidth allocation, wherein the logic configured to reserve the portion of the first amount of requested bandwidth is configured to increase the overall pool bandwidth allocation by the portion of the first amount of requested bandwidth.

9. The logic of claim 8 wherein a reserved amount is one selected from a group including the first amount of requested bandwidth and the portion of the first amount of requested bandwidth, the logic further configured to:
   obtain a second message associated with the first data flow, the second message including a third indicator that identifies the pool with which the first data flow is associated and a fourth indicator, the fourth indicator being arranged to indicate that at least a part of the reserved portion is to be transmitted outside of a reservation;
   determine whether to tear down approximately all of the reserved amount;
   tear down all of the reserved portion if it is determined that all of the reserved portion is to be torn down, wherein the logic configured to tear down all of the reserved portion includes logic configured to release approximately all of the reserved amount; and
   decrease the overall pool bandwidth allocation by the reserved amount.

10. The logic of claim 8 wherein the first message is a first resource reservation protocol (RSVP) reservation request, and the pool is associated with a plurality of discrete RSVP requests including the first RSVP reservation request.

11. The logic of claim 10 wherein the first RSVP reservation request includes a pool object, and wherein the pool object includes the second indicator and a third indicator, the third indicator being arranged to specify the maximum pool bandwidth allocation.

12. The logic of claim 10 wherein the plurality of discrete RSVP requests are associated with a single source endpoint, the single source endpoint being arranged to transmit the first RSVP reservation request.

13. The logic of claim 10 wherein the plurality of discrete RSVP requests are associated with a plurality of source endpoints including a first source, the first source endpoint being arranged to cause the first RSVP reservation request to be transmitted.

14. An apparatus comprising:
   a processing arrangement;
   an input/output (I/O) arrangement, the I/O arrangement being configured to obtain a message, the message being associated with a request to reserve a first amount of bandwidth associated with a resource, the request being associated with a pool of reservations, wherein the message includes a pool identifier that identifies the pool of reservations, the pool of reservations having a maximum pool bandwidth and an overall reserved amount of bandwidth;
   bandwidth reservation logic, wherein the processing arrangement is configured to execute the bandwidth reservation logic, the bandwidth reservation logic being configured to identify the pool and to determine when reserving the first amount of bandwidth in response to the request would cause the overall reserved amount of bandwidth to exceed the maximum pool bandwidth, wherein when reserving the first amount of bandwidth in response to the request would not cause the overall reserved amount of bandwidth to exceed the maximum pool bandwidth, the bandwidth reservation logic is arranged to reserve the first amount of bandwidth and to increase the overall reserved amount of bandwidth by the first amount of bandwidth, and wherein when reserving the first amount of bandwidth in response to the request would cause the overall reserved amount of bandwidth to exceed the maximum pool bandwidth, the bandwidth reservation logic is further arranged to determine a portion of the first amount of bandwidth that may be reserved without causing the overall reserved amount of bandwidth to exceed the maximum pool bandwidth, to reserve the portion of the first amount, and to increase the overall reserved amount of bandwidth by the portion of the first amount, wherein the portion of the first amount is less than or equal to a difference between the maximum pool bandwidth and the overall reserved amount of bandwidth.

15. The apparatus of claim 14 wherein the apparatus is a resource reservation protocol (RSVP) processing node.

16. The apparatus of claim 14 wherein the pool identifier and the overall reserved amount of bandwidth are included in a pool object, the pool object being included in the message.

* * * * *